United States Patent
Firkins et al.

(10) Patent No.: US 6,300,306 B1
(45) Date of Patent: Oct. 9, 2001

(54) SULPHONATED COPOLYMER AND A METHOD FOR CLEANING SURFACES

(75) Inventors: Simon Firkins; Marie-Eve Perier, both of Lyons; Sandrine Rochat, Villeurbane; Louis Vovelle, Lyons, all of (FR); Gladys Saliba Gabriel, Alamo, CA (US)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/520,742

(22) Filed: Mar. 8, 2000

Related U.S. Application Data

(60) Provisional application No. 60/123,418, filed on Mar. 9, 1999.

(51) Int. Cl.$^7$ ..................................................... C11D 3/37
(52) U.S. Cl. .............................................................. 510/476
(58) Field of Search ...................................... 510/475, 476

(56) References Cited

U.S. PATENT DOCUMENTS 3,734,874 * 5/1973 Kibler et al. .................... 260/29.2 E

FOREIGN PATENT DOCUMENTS

| 759459 A2 | * | 2/1997 | (EP) . |
| 2192167 | * | 2/1974 | (FR) . |
| WO 92/02570 | * | 2/1992 | (WO) . |
| WO 95/06058 | * | 3/1995 | (WO) . |
| WO 00/53711 | * | 9/2000 | (WO) . |

* cited by examiner

Primary Examiner—John Hardee
(74) Attorney, Agent, or Firm—John Daniel Wood; Jean-Louis Seugnet

(57) ABSTRACT

A water-soluble or water-dispersible copolymer comprising:
  at least one polyoxyalkylene (POA) unit; and
  at least one sulfonated polyamide (PAS) unit;
    the quantity of $SO_3M$ functions, expressed as the mass of $SO_3^-$ function, in said (PAS) unit or units is such that it represents at least 0.1% of the total mass of said copolymer;
    the total (POA) units/total (PAS) units mass ratio is 95/5 to 30/70/
    the number of amine functions —$NH_2$ present in said copolymer is at most 80 milliequivalents per kilogram of copolymer;
    the number of carboxyl functions —COOH present in said copolymer is at least 80 milliequivalents, preferably at least 100 milliequivalents per kilogram of copolymers.

18 Claims, No Drawings

SULPHONATED COPOLYMER AND A METHOD FOR CLEANING SURFACES

This application claims priority from U.S. provisional application Serial No. 60/123,418 filed Mar. 9, 1999

The present invention relates to a novel sulfonated copolymer comprising polyether and polyamide units, to a process for its preparation and to its use as a detergent for hard or textile surfaces, in particular formed from synthetic polymer, most particularly polyamide textile surfaces, and/or as an agent which can endow said surfaces with stain-resistance properties and/or which can facilitate soil release from said surfaces. It also relates to a method using said sulfonated copolymer, to clean and/or treat said surfaces to endow them with stain-resistance properties and/or to facilitate soil release. It also relates to detergent compositions comprising said copolymer.

French patent application FR-A-2 192 167 has proposed the use, in detergent compositions for washing polyamide fabrics, of copolymers obtained by condensation a) of an aliphatic dicarboxylic acid, b) of a hydroxypolyoxyalkylene compound and c) of a compound selected from amino acids or lactams, diamines or salts thereof with the dicarboxylic acid a), in combination with a detergent agent selected from ethoxylated alkylphenols, alkoxylated primary or secondary alcohols and alkoxylated monoethanolamides.

Patent application WO92/02570 describes dyed polyamide articles (fibers, carpets) which are resistant to acid stains, said polyamide being a polyhexamethylene adipamide, a poly-$\epsilon$-caprolactam or a hexamethylenediamine/adipic acid/$\epsilon$-caprolactam copolymer, containing 1% to 4% by weight of sulfonated aromatic carboxylic groups (for example 5-isophthalic acid) and containing 20 to 40 milliequivalents of amine end groups per $10^6$ g, said polyamide being dyed using an acid dye.

French patent application FR-A-2 722 804 describes water-soluble and/or water-dispersible copolyamides with a number-average molecular mass of 2000 to 30,000, comprising aromatic and/or aliphatic dicarbonyl, sulfoaryldicarbonyl and polyoxyalkylenediamine units, alone or with aliphatic diamine units, and their use to size synthetic polyamide yarns or synthetic polyamide fibers which may be mixed with natural, artificial or other synthetic fibers.

A first subject of the invention is thus a water-soluble or water-dispersible copolymer (C) comprising
  at least one polyoxyalkylene (POA) unit; and
  at least one sulfonated polyamide (PAS) unit;
said copolymer (C) being characterized in that:
  said polyoxyalkylene (POA) unit comprises 2 to 200, preferably 5 to 150, similar or different oxyalkylene elementary units, wherein the linear or branched alkylene residue contains 2 to 12, preferably 2 to 6, carbon atoms, most particularly 2 or 3 carbon atoms;
said sulfonated polyamide (PAS) unit comprises:
  (i) non-sulfonated polyfunctional units elementary (mNS) which may be similar or different, with formula (mNS$_1$) and/or (mNS$^2$)

—C(O)—A—C(O)—N(R)—D—N(R)—     (mNS$^1$)

(dicarbonyl/diimino)

and/or —C(O)—K—N(R)—     (mNS$^2$)

("lactam")

and/or —C(O)—K—N(R)—C(O)—A—C(O)—     (mNS$^3$)

("lactam"/dicarbonyl)

and/or —N(R)—D—N(R)—C(O)—K—N(R)—     (mNS$^4$)

(diimino/"lactam")
in which formulae
  A represents an aliphatic, cycloaliphatic or aromatic hydrocarbon group;
  D represents an aliphatic, cycloaliphatic or aromatic hydrocarbon group which may be interrupted by one or more oxygen or tertiary nitrogen hetero atoms;
  A K represents an aliphatic, cycloaliphatic or aromatic group;
  the symbols R are identical or different and represent a hydrogen atom or a $C_1$–$C_4$ alkyl group;
(ii) sulfonated polyfunctional elementary units (mS) which are similar or different, with formula:

—V—Q (L—SO$_3$M)$_n$—W— where:
the symbols V and W, which are identical or different, represent:

| | |
|---|---|
| a carbonyl | —C(O)— group; |
| an oxy | —O— group; |
| an imino | —NH— group; or |
| an (R)imino | —N(R)— group where R represents a $C_1$–$C_4$ alkyl group; | the symbol Q represents an aromatic, aliphatic or cycloaliphatic hydrocarbon group;
L is a valence bond or an alkylene, alkoxyalkylene, oxyalkylene, arylene, alkylarylene or alkoxyarylene group;
M represents a hydrogen atom or an alkaline cation;
n is 1 or more;
(iii) and binding groups (glPAS) of the elementary units of (PAS)
—C(O)—O— and/or —O—C(O)— and/or —C(O)—N(R)— and/or —N(R)—C(O)—, where R represents a hydrogen atom or a $C_1$–$C_4$ alkyl group;
the quantity of SO$_3$M functions, expressed as the mass of SO$_3$ function, in said (PAS) unit or units is such that it represents at least 0.1%, preferably at least 0.2%, most particularly at least 0.4%, in particular 0.4% to 15%, of the total copolymer (C) mass;
the mass ratio of the total (POA) units/total (PAS) units is 95/5 to 30/70, preferably 90/10 to 40/60, most particularly 85/15 to 50/50;
the number of amine functions —NH$_2$ present in said copolymer (C) is at most 80 milliequivalents per kilogram of copolymer (C);
the number of carboxyl functions —COOH present in said copolymer (C) is at least 80 milliequivalents, preferably at least 100 milliequivalents per kilogram of copolymer (C).

Copolymer (C) can have a number-average molecular mass of 100,000 or less, preferably 70,000 or less, most particularly 5000 to 60,000, measured at 100° C. by gel exclusion chromatography (SEC) in solution in dimethylacetamide (DMAC) with $10^{-2}$ mol of added LiBr; this mass is measured in polystyrene equivalents.

Said copolymer (C) can also comprise monovalent functions other than —COOH and —NH$_2$.

Examples which can be cited are hydroxyl, alcohol, (R)amino, urea, imide, ester, alkyl, aryl, and quaternary ammonium functions.

Said copolymers (C) can be of any type—linear, branched, crosslinked, etc.

Preferably, said copolymer is a linear block polymer; the ratio of the number of (POA) units/number of (PAS) units is 1/2 to 2/1.

The optional monovalent —$NH_2$ functions and —COOH functions are generally at the ends of the chains of copolymer (C).

Said copolymers can also comprise, in their polyamide (PAS) unit(s), other polyfunctional units such as:

non-sulfonated dicarbonyl elementary units (mD) with formula —C(O)—A—C(O)—, where A represents an aliphatic, cycloaliphatic or aromatic hydrocarbon group, similar or not similar to the dicarbonyl sub-elementary unit of the (mNS$^1$) (mNS3) elementary unit, not bonded to a diimino sub-elementary unit —N(R)—D—N(R)— or to a "lactam" elementary unit —C(O)—K—N(R)—;

non-sulfonated polyfunctional elementary units (mP) with formula:
(i) —X—E—Y— where
the symbols X and Y, which may be identical or different, represent:

| | |
|---|---|
| an oxy | —O— group; |
| an imino | —NH— group; or |
| an (R)imino | —N(R)— group where R represents a $C_1$–$C_4$ alkyl group; | the symbol E represents a polyvalent aliphatic, cycloaliphatic or aromatic hydrocarbon group which may be interrupted by one or more oxygen or tertiary nitrogen heteroatom(s), said polyvalent group being bonded to at least one group X and to at least one group Y; or
(ii) —C(O)—E'—C(o)—, where
the symbol E' represents an aliphatic, cycloaliphatic or aromatic hydrocarbon group substituted with at least one hydroxyl or carboxyl group.

Non-sulfonated polyfunctional elementary units (mNS$^1$) (dicarbonyl/diimino) which can be mentioned include those in which:

the dicarbonyl sub-elementary unit is an aliphatic or cycloaliphatic elementary unit the aliphatic or cycloaliphatic residue of which contains 2 to 10 carbon atoms, such as adipoyl, glutaroyl, succinoyl, trimethyladipoyl, pimeloyl, azeloyl, sebacoyl, suberoyl, itaconoyl, maleoyl, fumaroyl, dicarbonyl cyclopentanes, dicarbonyl cyclohexanes, 2-oxymethylsuccinoyl, oxymethylglutaroyl or oxyglutaroyl elementary units;

the dicarbonyl sub-elementary unit is an aromatic elementary unit, such as terephthaloyl, isophthaloyl, orthophthaloyl, dicarbonyl naphthalenes, dicarbonyl anthracenes, dicarbonyl biphenyl, dicarbonyl oxy-isophthalics or dicarbonyl 4-oxyphthalic elementary units;

the diimino sub-elementary unit is an aliphatic elementary unit wherein the aliphatic residue is a linear, branched or cyclic alkylene group containing 2 to 50, preferably 2 to 20, carbon atoms and can be interrupted by one or more oxygen or tertiary nitrogen heteroatoms, such as ethylenediimino, tetramethylenediimino, hexamethylenediimino, methylpentamethylenediimino, 3-oxapentamethylenediimino or 3,6-dioxaoctamethylene-1,8-diimino elementary units;

the diimino sub-elementary unit is an aromatic elementary unit in which the aromatic residue is a phenylene radical or a divalent radical consisting of a combination of a plurality of benzene rings which may be substituted, ortho- or peri-fused or bonded together by inert groups such as a single valence bond, an alkylene radical, an oxy group or an oxo group, a sulfonyl group, including the para-phenylenediimino elementary unit or the diphenylmethanediimino elementary unit wherein the phenyl rings are optionally substituted with a $C_2$–$C_3$ alkyl radical.

Non-sulfonated polyfunctional elementary units (mNS$^2$), ("lactam") which can be mentioned include aliphatic or aromatic units wherein the aliphatic or aromatic residue contains 2 to 20 carbon atoms, such as 6-iminocaproyl, 11-iminoundecanoyl, 12-iminododecanoyl, 3-imino-2-dimethylpropionyl or 4-(β-iminoethyl)benzoyl elementary units.

Non-sulfonated polyfunctional elementary units (mNS$^3$) ("lactam"/dicarbonyl) which can be mentioned include those in which:

the "lactam" sub-elementary unit is an aliphatic or aromatic elementary unit wherein the aliphatic or aromatic residue contains 2 to 20 carbon atoms, such as 6-iminocaproyl, 11-iminoundecanoyl, 12-iminododecanoyl, 3-imino-2-dimethylpropionyl or 4-(β-iminoethyl)benzoyl elementary units the dicarbonyl sub-elementary unit is an aliphatic or cycloaliphatic elementary unit the aliphatic or cycloaliphatic residue of which contains 2 to 10 carbon atoms, such as adipoyl, glutaroyl, succinoyl, trimethyladipoyl, pimeloyl, azeloyl, sebacoyl, suberoyl, itaconoyl, maleoyl, fumaroyl, dicarbonyl cyclopentanes, dicarbonyl cyclohexanes, 2-oxymethylsuccinoyl, oxymethylglutaroyl or oxyglutaroyl elementary units;

the dicarbonyl sub-elementary unit is an aromatic elementary unit, such as terephthaloyl, isophthaloyl, orthophthaloyl, dicarbonyl naphthalenes, dicarbonyl anthracenes, dicarbonyl biphenyl, dicarbonyl oxy-isophthalics or dicarbonyl 4-oxyphthalic elementary units;

Non-sulfonated polyfunctional elementary units (mNS$^4$) (diimino/"lactam") which can be mentioned include those in which:

the diimino sub-elementary unit is an aliphatic elementary unit wherein the aliphatic residue is a linear, branched or cyclic alkylene group containing 2 to 50, preferably 2 to 20, carbon atoms and can be interrupted by one or more oxygen or tertiary nitrogen heteroatoms, such as ethylenediimino, tetramethylenediimino, hexamethylenediimino, methylpentamethylenediimino, 3-oxapentamethylenediimino or 3,6-dioxaoctamethylene-1,8-diimino elementary units;

the diimino sub-elementary unit is an aromatic elementary unit in which the aromatic residue is a phenylene radical or a divalent radical consisting of a combination of a plurality of benzene rings which may be substituted, ortho- or peri-fused or bonded together by inert groups such as a single valence bond, an alkylene radical, an oxy group or an oxo group, a sulfonyl group, including the para-phenylenediimino elementary unit or the diphenylmethanediimino elementary unit wherein the phenyl rings are optionally substituted with a $C_2$–$C_3$ alkyl radical.

the "lactam" sub-elementary unit is an aliphatic or aromatic elementary unit wherein the aliphatic or aromatic residue contains 2 to 20 carbon atoms, such as 6-iminocaproyl, 11-iminoundecanoyl, 12-iminododecanoyl, 3-imino-2-dimethylpropionyl or 4-(β-iminoethyl)benzoyl elementary units Sulfonated polyfunctional elementary units (mS) which can be mentioned include:

aliphatic dicarbonyl elementary units in which the aliphatic residue contains 2 to 10 carbon atoms, optionally substituted with at least one aryl radical, in particular phenyl, and having at least one sulfo substituent bonded to a carbon atom, such as the sulfosuccinyl, 3-sulfoglutaroyl or 3-(4-sulfophenyl)glutaroyl elementary units;

aromatic dicarbonyl elementary units in which the aromatic residue is a phenylene radical or a divalent radical consisting of a combination of a plurality of ortho- or peri-fused benzene rings or bonded together by inert groups such as a single valence bond, an alkylene radical, an oxy group, an oxo group or a sulfonyl group, said aromatic residue having at least one sulfo substituent bonded to a carbon atom, such as sulfophthaloyl, sulfoterephthaloyl, sulfoisophthaloyl, sulfo-orthophthaloyl, sulfonaphthalenedicarbonyl, disulfo- and trisulfonaphthalenedicarbonyl, 5-(4-sulfophenoxy)-isophthaloyl, 5-(2-sulfophenyl)-isophthaloyl, 5-(4-sulfophenoxy)-isophthaloyl, sulfo-diphenyl-dicarbonyl, sulfo-diphenylsulfone-4,4'-dicarbonyl or sulfodiphenylmethane-4,4'-dicarbonyl elementary units;

aliphatic elementary units containing oxy groups in which the aliphatic residue contains 2 to 10 carbon atoms and has at least one sulfo substituent directly bonded to a carbon atom, such as a 2,3-dioxypropanesulfonic or a 1,5-dioxypentane-3-sulfonic elementary unit, or indirectly such as a 2,3-dioxypropane poly(oxyethylene) sulfonic elementary unit or a 2,3-dioxypropane poly(oxyethylene)phenol sulfonic elementary unit;

aliphatic elementary units containing oxy and carbonyl groups, in which the aliphatic residue contains 2 to 10 carbon atoms, having at least one sulfo substituent bonded to a carbon atom, such as a 3-oxysulfopropionyl or a 5-oxy-3-sulfopentanoyl elementary unit;

aromatic elementary units containing imino groups with at least one sulfo substituent bonded to a carbon atom, such as sulfo-para-phenylenediimino elementary units.

Optional non-sulfonated polyfunctional elementary units which can be mentioned include:

aliphatic elementary units containing imino groups, wherein the aliphatic residue is a linear or branched alkylene group containing 2 to 50, preferably 2 to 20, carbon atoms and which can be interrupted by one or more oxygen or tertiary nitrogen heteroatoms, such as ethylenediimino, tetramethylenediimino, hexamethylenediimino, 3-oxa-pentamethylenediimino or 3,6-dioxa-octamethylene-1,8-diimino elementary units;

aromatic elementary units containing imino groups such as the para-phenylenediimino elementary unit;

aliphatic or cycloaliphatic elementary units containing oxy groups such as:

oxyalkylenoxy elementary units wherein the alkylene residue is linear or branched or oxycycloalkylenoxy, and contains 2 to 12, preferably 2 to 6, carbon atoms, such as oxyethylenoxy, 1,3-propanedioxy, oxypropylenoxy, 2,2-propanedimethoxy, 1,4-cyclohexanedimethoxy and their oxy[poly(cyclo)alkylenoxy] higher homologs containing 2 to 150 (cyclo)alkylenoxy elementary units;

alkanetrioxy elementary units containing 3 to 6 carbon atoms, such as 1,2,3-propanetrioxy, 1,2,4-butanetrioxy and their poly(alkanetrioxy) higher homologs containing 2 to 10 alkanetrioxy elementary units;

aliphatic, aromatic or heterocyclic units containing oxy and imino groups, wherein the aliphatic or aromatic, heterocyclic residues contain 2 to 20 carbon atoms, such as 5-imino-1-pentanoxy, 4-iminomethylcyclohexanemethoxy, 5-imino-2-ethylpentanoxy or oxyisophthalic diimino elementary units;

substituted hydroxy and/or carboxy dicarbonyl elementary units such as 2-hydroxy-2-carboxypropane dicarbonyl.

The (PAS) unit preferably comprises elementary units corresponding to aliphatic polyamides such as PA 4, PA 6, PA 10, PA 11, PA 12, PA 6.6, PA 4.6, PA 10.6 further containing sulfonated elementary units, preferably sulfonated dicarbonyls (sulfosuccinyl or sulfisophthalyl in particular), all or a portion of the non-sulfonated aliphatic dicarbonyl elementary units being capable of being replaced by aromatic dicarbonyl elementary units.

Each polyoxyalkylene (POA) unit can be bonded to a sulfonated polyamide (PAS) unit via similar or different binding groups comprising at least one N, O or S heteroatom; such binding groups can be amide, ester, carbamate, oxy, ureylene, thio etc. groups.

Said copolymers (C) can be obtained by:

reaction between a sulfonated polyamide prepolymer (PP1) containing the (PAS) unit with acid and/or amine end groups with a polyoxyalkylenated prepolymer (PP2) containing the (POA) unit wherein at least one end group is capable of reacting with the acid and/or amine end groups of said prepolymer (PP1), either directly, or via an agent which is capable of forming a bridge;

then optionally, reaction with a compound which can consume the amine functions —$NH_2$. Said sulfonated polyamide prepolymer (PPd) can be prepared in a known manner, controlling the degree of progress of the polycondensation reaction to obtain a prepolymer with the desired molecular mass, preferably employing an excess of dibasic acid monomer to encourage the formation of acid end groups.

Examples of polyoxyalkylenated prepolymer (PP2) wherein at least one end group is capable of reacting with the acid and/or amine end groups of said prepolymer (PP1) which can be mentioned are those with at least one alcohol, amine, acid, epoxy, urethane, etc. end group, such as:

polyoxypropylene and/or polyoxyethylene diamines or triamines, such as the D, ED, EDR and T JEFFAMINES® sold by HUNTSMAN with a molecular mass of the order of 1500 to 5000;

polyethylene glycols, polypropylene glycols, block or random copolymers of ethylene glycol and propylene glycol with a molecular mass of the order of 200 to 10,000, such as PLURONICS PE from BASF;

diepoxy polyoxyethylenes and/or polyoxypropylenes with a molecular mass of the order of 300 to 5000;

polyoxyethylene and/or polyoxypropylene diisocyanates with a molecular mass of the order of 3000 to 5000;

dicarboxylic polyoxyethylenes and/or polyoxypropylenes with a molecular mass of the order of 3000 to 5000;

methoxypolyoxypropylenes and/or polyoxyethylenemonoamines, such as the JEFFAMINES® sold by HUNTSMAN with a molecular mass of the order of 90 to 5000;

methoxypolyoxypropylene and/or polyoxyethylenemonohydroxy compounds, with a molecular mass of the order of 1000 to 25,000;

methoxypolyoxypropylene and/or polyoxyethylenemonocarboxy compounds, with a molecular mass of the order of 5000;

methoxypolyoxypropylenes and/or polyoxyethylene monoisocyanates, with a molecular mass of the order of 3000 to 5000.

The quantity of $SO_3M$ functions, expressed as the mass of the $SO_3$ function, in said sulfonated polyamide prepolymer (PP1) is such that it represents at least 0.1%, preferably at least 0.2%, most particularly at least 0.4%, in particular 0.4 to 15% of the total mass of sulfonated polyamide prepolymer (PP1) and polyoxyalkylenated prepolymer (PP2).

The respective quantities of polymer (PP2) and (PP1) are such that the (PP2)/(PP1) mass ratio is 95/5 to 30/70, preferably 90/10 to 40/60, most particularly 85/15 to 50/50.

Compounds which are capable of consuming amine functions —$NH_2$ which can be mentioned include:

carboxylic acids such as succinic acid or isophthalic acid sodium sulfonate;

carboxylic anhydrides, such as succinic anhydride, phthalic anhydride or maleic anhydride;

mono- or poly-functional epoxides, such as epoxyalkanes containing 4 to 18 carbon atoms;

monoisocyanates such as dodecane isocyanate;

quaternary acrylates or methacrylates, such as the MATQUATs from [lacuna] Atochem.

They can be used in a quantity such that the quantity of —$NH_2$ functions which may be present in the final copolymer does not represent more than 80 milliequivalents per kilogram of the final copolymer.

Said copolymer (C) can also, and preferably, be obtained by polycondensation of monomers (M) from which the (PAS) unit is derived in the presence of a prepolymer (PP) containing the polyoxyalkylene unit (POA) and carrying elementary units or functions which can condense together or react with at least one of said monomers, and optional post-reaction with an agent which consumes amine functions —$NH_2$.

Non-sulfonated dicarboxylic monomers (MDC) which can form non-sulfonated polyfunctional elementary units ($mNS^1$) by condensation with a diamine, non-sulfonated polyfunctional elementary units ($mNS^3$) by condensation with a lactam, or which can form optional non-sulfonated dicarbonyl elementary units (mD), which can be mentioned include:

aromatic dicarboxylic acids wherein the aromatic residue is optionally substituted with at least one alkyl radical containing 1 to 4 carbon atoms or with a hydroxyl radical, such as phthalic, terephthalic, isophthalic or orthophthalic acid, anthracene-, 1,8-naphthalene-, 1,4-naphthalene- or biphenyl-dicarboxylic acids, 5-hydroxyisophthalic, 4-hydroxy-isophthalic or 4-hydroxyphthalic acid;

aliphatic or cycloaliphatic dicarboxylic acids wherein the aliphatic or cycloaliphatic residue contains 4 to 10 carbon atoms, such as adipic, glutaric, succinic, trimethyladipic, pimelic, azelaic, sebacic, suberic, itaconic, maleic or fumaric acid, cyclopentanedicarboxylic acids, cyclohexanedicarboxylic acids, 2-hydroxymethylsuccinic acid, hydroxymethylglutaric acid or hydroxyglutaric acid.

Non-sulfonated diamine monomers (MDA) which are capable of forming non-sulfonated polyfunctional units ($mNS^1$) by condensation with a non-sulfonated dicarboxylic monomer or non-sulfonated polyfunctional elementary units ($mNS^4$) by condensation with a lactam and which can be mentioned include:

aliphatic diamines containing 2 to 50 carbon atoms such as alkylenediamines, wherein the linear, branched or cyclic alkylene group is optionally interrupted by one or more oxygen or tertiary nitrogen heteroatoms, such as ethylenediamine, tetramethylenediamine, hexamethylenediamine, 3-oxapentamethylenediamine or 3,6-dioxaoctamethylene-1,8-diamine;

aromatic diamines in which the aromatic residue is a phenylene radical or a divalent radical constituted by a combination of a plurality of benzene rings ortho- or peri-fused or bonded together by inert groups, including a single valence bond, an alkylene radical, oxy group, oxo group or sulfonyl group, such as arylenediamines including para-phenylenediamine or diaminodiphenylmethane wherein the phenyl residues are optionally substituted with a $C_2$–$C_3$ alkyl radical.

Non-sulfonated amino acid monomers (MAA) which are capable of forming non-sulfonated polyfunctional elementary units ($mNS^2$), non-sulfonated polyfunctional elementary units ($mNS^2$) by condensation with a non-sulfonated dicarboxylic monomer or non-sulfonated polyfunctional elementary units ($mNS^4$) by condensation with a diamine and which can be mentioned include:

aromatic, aliphatic or heterocyclic monocarboxylic amino acids containing 2 to 20 carbon atoms, and their lactams such as 6-aminocaproic acid, caprolactam, 3-amino-2-dimethylpropionic acid, 4-(β-aminoethyl) benzoic acid, lauryllactam.

Sulfonated monomers (MS) which can form sulfonated polyfunctional elementary units (mS) and which can be mentioned include:

those with two reactive carbonyl functions, such as:

aromatic dicarboxylic acids wherein the aromatic residue is a phenylene radical or a divalent radical constituted by a combination of a plurality of benzene rings ortho- or peri-fused or bonded together by inert groups including a single valence bond, an alkylene radical, an oxy group, an oxo group or a sulfonyl group, and is optionally substituted with at least one hydroxyl radical substituent, such as sulfophthalic, sulfoterephthalic, sulfoisophthalic, sulfo-ortho-phthalic or 4-sulfonaphthalene-2,7-dicarboxylic acid, 5-(4-sulfophenyl)isophthalic acid, 5-(2-sulfophenyl) isophthalic acid, 5-(4-sulfophenoxy)isophthalic acid, sulfobis(hydroxycarbonyl)-4,4'-diphenylsulfones, sulfodiphenyldicarboxylic acids, sulfophenyldicarboxybenzene sulfonates, sulfobis(hydroxycarbonyl)-4,4'-diphenylmethanes, 5-sulfophenoxyisophthalic acids and more generally, those described in U.S. Pat. No. 3 734 874;

aliphatic dicarboxylic acids wherein the aliphatic residue contains 2 to 10 carbon atoms and is optionally substituted with an aryl radical, in particular a phenyl radical, such as sulfosuccinic acid, 3-sulfoglutaric acid, 3-(4-sulfophenyl)glutaric acid, etc.;
in the form of acids or $C_1$–$C_4$ esters;

those with two reactive hydroxyl functions such as sulfoaliphatic diols wherein the aliphatic residue contains 2 to 10 carbon atoms, such as 2,3-dihydroxypropanesulfonic acid, 1,5-dihydroxypentane-3-sulfonic acid, aliphatic diols containing 2 to 3 carbon atoms substituted with poly(oxyethylene) sulfonic groups or poly(oxyethylene) phenol sulfonic groups, such as poly(oxyethylene) sulfonic 1,2-propanediols and poly(oxyethylene)phenol sulfonic 1,2-propane diols;

those with a reactive hydroxyl function and a reactive carboxyl function such as aliphatic hydroxy acids wherein the aliphatic residue contains 2 to 10 carbon atoms, such as 3-hydroxysulfopropionic or 5-hydroxy-3-sulfopentanoic acid;

those with two amine functions such as 2,5-diaminobenzenesulfonic acid.

Preferred sulfonated monomers (mS) are sulfoisophthalic and sulfosuccinic acids.

Non-sulfonated monomers (MP) capable of forming non-sulfonated polyfunctional elementary units (mP) which can be mentioned include:

diols or triols containing 2 to 20 carbon atoms such as:
ethylene glycol and its higher homologues which can contain up to 20 oxyethylene units, in particular ethylene glycol, diethylene glycol and triethylene glycol;

linear or branched alkylene glycols which can contain up to 150 carbon atoms, optionally interrupted by one or more oxygen heteroatom(s), such as 1,3-propanediol, propylene glycol; dipropylene glycol, 2,2-dimethylolpropane or 1,4-cyclohexanedimethanol;

glycerol, 1,2,4-butanetriol and 1,2,3-butanetriol and their higher homologues which can contain up to 10 repeat units;

aliphatic hydroxycarboxylic acids containing 2 to 10 carbon atoms such as 3-hydroxypropionic, 4-hydroxybutyric, citric, 4-hydroxyisophthalic or 2,5-dihydroxyterephthalic acid;

aliphatic, aromatic or heterocyclic amino alcohols containing 2 to 20 carbon atoms such as 5-amino-1-pentanol, 4-aminomethylcyclohexanemethanol or 5-amino-2-ethylpentanol.

Monomers (M) are preferably selected from those from which aliphatic polyamides of the PA 4, PA 6, PA 10, PA 11, PA 12, PA 6.6, PA 4.6, PA 10.6 type are derived, further comprising sulfonated monomers, preferably sulfonated dicarboxylic acids (in particular sulfosuccinic or sulfoisophthalic acids), all or a portion of the non-sulfonated aliphatic dicarboxylic acids possibly being replaced with aromatic dicarboxylic acids.

Prepolymers (PP) with a polyoxyalkylene (POA) chain carrying elementary units which are capable of condensing with each other or reacting with at least one of said monomers from which the sulfonated polyamide is derived and which can be mentioned include those containing 2 to 200, preferably 5 to 150, similar or different oxyalkylene elementary units wherein the linear or branched alkylene residue contains 2 to 12, preferably 2 to 6, carbon atoms, most particularly 2 or 3 carbon atoms and also containing at least one alcohol, amine, acid, epoxy, urethane, etc. end group, such as:

polyoxypropylene and/or polyoxyethylene diamines or triamines such as the D, ED, EDR or T JEFFAMINES® sold by HUNTSMAN with a molecular weight of the order of 1500 to 5000;

polyethylene glycols, polypropylene glycols, block or random copolymers of ethylene glycol and propylene glycol with a molecular mass of the order of 200 to 10,000, such as the PLURONICS PE from BASF;

diepoxy polyoxyethylene and/or polyoxypropylene compounds with a molecular mass of the order of 300 to 5000;

polyoxyethylene and/or polyoxypropylene diisocyanates with a molecular mass of the order of 3000 to 5000;

dicarboxylic polyoxyethylene and/or polyoxypropylene compounds with a molecular mass of the order of 3000 to 5000;

methoxypolyoxypropylene and/or polyoxyethylenemonoamines, such as the JEFFAMINES® sold by HUNTSMAN with a molecular mass of the order of 90 to 5000;

methoxypolyoxypropylene and/or polyoxyethylenemonohydroxy compounds, with a molecular mass of the order of 1000 to 25,000;

methoxypolyoxypropylene and/or polyoxyethylenemonocarboxy compounds with a molecular mass of the order of 5000;

methoxypolyoxypropylene and/or polyoxyethylenemonoisocyanates with a molecular mass of the order of 3000 to 5000.

The polycondensation operation on the monomers (M), from which the (PAS) unit is derived, in the presence of said prepolymer (PP) containing the polyoxyalkylene (POA) unit can be carried out:

by bringing the prepolymer (PP) and the different monomers (M) into contact in the form of a powder, in the liquid form or in an aqueous solution;

the relative quantities of the different monomers (M) being such that the molar ratio of the number of their carboxylic functions/number of their amine functions is at least 1, preferably at least 1.05, most particularly at least 1.1;

the quantity of sulfonated monomer, expressed as the mass of $SO_3$, is such that it represents at least 0.1%, preferably at least 0.2%, most particularly at least 0.4%, in particular 0.4% to 15% of the total mass of monomers (M) and prepolymer (PP) used;

the relative quantities of prepolymer (PP) and monomers (M) being such that the prepolymer (PP)/total monomers (M) weight ratio is 95/5 to 30/70, preferably 90/10 to 40/60, most particularly 85/15 to 50/50;

then polycondensation proper in an inert atmosphere, at a temperature of the order of 190° C. to 280° C., preferably of the order of 220° C. to 270° C., with distillation of the water formed;

and optional post-condensation or post-reaction of the copolymer formed with a compound which consumes amino functions —$NH_2$ in a quantity such that the quantity of —$NH_2$ functions possibly present in the final copolymer does not represent more than 80 milliequivalents per kilogram of the final copolymer.

The contact operation can be carried out at a temperature which can be from ambient temperature to 100° C.

The polycondensation operation proper can be carried out in the presence of a polyamidation catalyst; the following in particular can be cited: hypophosporous acid, phenylphosphinic acid, phenylphosphonic acid or tris(nonylphenyl) phosphite; this catalyst can be present in a quantity which can be up to 1%, preferably up to 0.5% by weight with respect to the total weight of prepolymer (PP) and monomers (M).

This operation is preferably carried out in steps:

a step for raising the temperature, for example from ambient temperature to 280° C., preferably to 270° C., at atmospheric pressure; this step generally takes 3 to 7 hours, during which step the water is distilled;

a constant temperature stage under the same conditions, for a period generally of the order of 10 minutes to 2 hours, preferably 1 hour;

a constant temperature stage at the same temperature, under reduced pressure (less than 10 mbar, preferably 2 to 3 mbar), for a period generally of the order of 1 to 3 hours before bringing back to atmospheric pressure and cooling the copolymer obtained.

If necessary, a post-condensation step using compounds which can consume the —$NH_2$ amine functions can be carried out to eliminate at least a portion of the —$NH_2$ functions present.

Compounds which are capable of consuming —$NH_2$ amine functions which can be mentioned include:

carboxylic acids such as succinic acid or isophthalic acid sodium sulfonate;

carboxylic anhydrides such as succinic anhydride, phthalic anhydride or maleic anhydride;

mono- or polyfunctional epoxides such as epoxyalkanes containing 4 to 18 carbon atoms;

monoisocyanates such as dodecane isocyanate;

quaternary acrylates or methacrylates such as the MATQUATs from [lacuna] Atochem.

They can be employed in a quantity such that the quantity of —$NH_2$ functions possibly present in the final copolymer does not represent more than 80 milliequivalents per kilogram of the final copolymer.

A second subject of the invention is a detergent agent for hard or textile surfaces, in particular made of synthetic polymer, most particularly polyamide textile surfaces, and/or an agent which is capable of endowing said surface with stain resistance properties and/or which can facilitate soil release from said surfaces, said agent comprising at least one of said water-soluble or water-dispersible copolymers (C) described above.

A third subject of the invention is the use of said copolymer (C) as a detergent agent for hard or textile surfaces, in particular made of synthetic polymer, most particularly polyamide textile surfaces, and/or as an agent which is capable of endowing said surfaces with stain resistance properties and/or of facilitating soil release from said surfaces.

A fourth subject of the invention is a method for cleaning hard or textile surfaces, in particular made of synthetic polymer, most particularly polyamide textile surfaces, and/or for endowing said surfaces with stain resistance properties and/or for facilitating soil release from said surfaces, by non permanent treatment of said surfaces using a water-soluble or water-dispersible copolymer (C), said copolymer (C) being present in solution or aqueous dispersion.

Said copolymer (C) can be used in solid or liquid cleaning and/or treating formulations; said formulations may contain from 0.05 to 10, preferably from 0.1 to 2% by weight of copolymer (C).

A first application pertains to the cleansing and/or the treating of hard surfaces with copolymer (C).

Said hard surfaces can be ceramic, glass, porcelain, etc. surfaces. An example which can be cited is the use of said copolymer either as it is in aqueous solution, or in an aqueous formulation, for cleaning crockery, bathrooms, or kitchens.

In a particular aspect, this invention concerns aqueous shower rinsing compositions and methods for keeping said showers clean. United States patents U.S. Pat. No. 5 536 452 and U.S. Pat. No. 5 587 022 describe compositions and methods similar to those of the present invention but which use surfactants which are different than the surfactants used in the present invention. Thus for a general description of aqueous shower rinsing compositions and methods for their application, the descriptions of United States patents U.S. Pat. No. 5 536 452 and U.S. Pat. No. 5 587 022 are incorporated into the present description by reference.

Showers may be for example in ceramics, plexiglass, glass fibers.

The principal active components of the aqueous shower rinsing compositions of the present invention are at least one surfactant described below, a metal-chelating agent, and a polyamide which is also designated copolymer C below. Preferred metal-chelating agents are ethylenediaminetetraacetic acid (EDTA) and the like.

Aqueous shower rinsing compositions typically contain water, optionally with at least one lower alcohol in a large quantity and each of the active constituents in smaller quantities; typically, said small quantities are in the range from about 0.1% to about 5% by weight, more typically between about 0.5% and about 3% by weight, and still more typically between about 1% and about 2% by weight.

Certain surfactants which can be used in the present invention have been described in United States patents U.S. Pat. No. 5 536 452 and U.S. Pat. No. 5 587 022 incorporated into the present description by reference. Still more suitable surfactants are described in United States patent applications Ser. No. 60/086,113 filed on May 20 1998 and U.S. patent application Ser. No. 60/098,148 filed on Aug. 27 1998, the descriptions of which are hereby incorporated into the present description by reference. The still more suitable surfactants are characterized as being ethoxylates of fatty esters, for example ethoxylated sorbitan monooleates and ethoxylated castor oil. Specific examples of such surfactants are 20 mol ethoxylated sorbitan monooleate (sold by Rhodia Inc. under the trade name ALKAMULS PSMO-20 with an HLB of 15.0) and 30 or 40 mol ethoxylated castor oil (sold by Rhodia Inc. under the trade name ALKAMULS EL-620 (HLB of 12.0) and EL-719 (HLB of 13.6), respectively). The degree of ethoxylation is preferably sufficient to obtain a surfactant with an HLB of more than 13.

The copolymers (C) can be used in aqueous shower rinsing compositions in a quantity of about 0.05% to about 10% by weight, more typically about 0.1% to about 2% by weight of the aqueous shower rinsing composition.

Said compositions can be sprayed onto the showers after having first humidified said showers with water.

A second application pertains to the cleaning and/or the treating of textile surfaces with said copolymers (C).

Preferably, textile surfaces are made of a synthetic organic polymer, in particular of polyamide; most particularly, they are textile surfaces such as moquettes, carpets, fabrics, clothing, underwear, furniture, sport articles, etc., made of synthetic organic polymer, in particular polyamide.

Said copolymer (C) can endow these textile surfaces with hydrophilic properties, stain resistance properties, in particular resistance to greasy stains (shoe polish, ball-point pen, lipstick, oil, etc.) or aqueous stains (coffee, etc.).

It can also facilitate removal of these stains and soil release, in particular that transported on the soles of shoes (dust, clay, dirt, etc.).

Said copolymers (C) or said compositions comprising said copolymers (C), put in aqueous solution or dispersion (before or during the treatment) may be applied to textile surfaces by spreading with possible rubbing, spraying, using an apparatus, laundering, rinsing or softening manually or with a machine. They may also be applied by contact in a drying apparatus of said textile surfaces.

A particular aspect pertains to solid or liquid compositions for laundering and/or rinsing and/or softening of household linen and clothes by hand or in a machine. Copolymer (c) endows hydrophilic properties to linen or clothes, endowing a better water vapour permeability to synthetic fabrics, and, therefore a better comfort for skin contact.

Said laundering and/or rinsing and/or softening compositions for linen or clothes can contain from 0.05 to 10%, preferably from 0.1 to 2% by weight of copolymer (C).

Said composition can also comprise other additives including:
  anionic surfactants such as:
    alkylester sulfonates with formula R—CH($SO_3$M)—COOR' where R represents a $C_8$–$C_{20}$ alkyl radical, preferably $C_{10}$–$C_{16}$, R' is a $C_1$–$C_6$ alkyl radical, preferably $C_1$–$C_3$ and M is an alkali metal cation (sodium, potassium, lithium), a substituted or non substituted ammonium (methyl-, dimethyl-, trimethyl-, tetramethylammonium, dimethylpiperidinium, etc.) or an alkanolamine derivative (monoethanolamine, diethanolamine, triethanolamine,etc.);
    alkylsulfates with formula ROS$O_3$M, where R represents a $C_5$–$C_{24}$ alkyl or hydroxyalkyl radical, preferably $C_{10}$–$C_{18}$ and M represents a hydrogen atom or a cation with the same definition as above, and their ethoxylated (OE) and/or propoxylated (OP) derivatives containing an average of 0.5 to 30 units, preferably 0.5 to 10 OE and/or OP units;
    alkylamide sulfates with formula RCONHR' OS$O_3$M where R represents a $C_2$–$C_{22}$ alkyl radical, preferably $C_6$–$C_{20}$, R' represents a $C_2$–$C_3$ alkyl radical and M represents a hydrogen atom or a cation as defined above, and their ethoxylated (OE) and/or propoxylenated (OP) derivatives containing an average of 0.5 to 60 OE and/or OP units;
    salts of saturated or unsaturated $C_8$–$C_{24}$ fatty acids, preferably $C_{14}$–$C_{20}$, $C_9$–$C_{20}$ alkylbenzenesulfonates, primary or secondary $C_8$–$C_{22}$ alkylsulfonates, alkylglycerol sulfonates, sulfonated polycarboxylic acids as described in GB-A-1 082 179, paraffin sulfonates, N-acyl N-alkyltaurates, alkylphosphates, isethionates, alkylsuccinamates, alkylsulfosuccinates, sulfosuccinate monoesters or diesters, N-acyl sarcosinates, alkylglycoside sulfates or polyethoxycarboxylates, the cation being an alkali metal (sodium, potassium, lithium), a substituted or non-substituted ammonium residue (methyl-, dimethyl-, trimethyl-, tetramethylammonium, dimethylpiperidinium, etc.) or an alkanolamine derivative (monoethanolamine, diethanolamine, triethanolamine, etc.). with non-ionic surfactants such as:
  polyoxyalkylenated (polyethoxyethylenated, polyoxypropylenated, polyoxybutylenated) alkylphenols where the alkyl substituent is $C_6$–$C_{12}$, containing 5 to 25 oxyalkylene units; examples which can be cited are TRITON X-45, X-114, X-100 or X-102 sold by Rohm & Haas Cy., and IGEPAL NP2 to NP 17 from RHODIA; polyoxyalkylenated $C_8$–$C_{22}$ aliphatic alcohols containing 1 to 25 oxyalkylene (oxyethylene, oxypropylene) units; examples which can be cited are TERGITOL 15-S-9 and TERGITOL 24-L-6 NMW sold by Union Carbide Corp., NEODOL 45-9, NEODOL 23-65, NEODOL 45-7 and NEODOL 45-4 sold by Shell Chemical Co., KYRO EOB sold by Procter & Gamble Co., SYNPERONIC A3 to A9 from ICI and RHODASURF IT, DB and B from RHODIA;
  products resulting from the condensation of ethylene oxide or propylene oxide with propylene glycol, ethylene glycol, with a weight-average molecular mass of the order of 2000 to 10,000, such as the PLURONICs sold by BASF;
  products resulting from condensation of ethylene oxide or propylene oxide with ethylenediamine, such as the TETRONICs sold by BASF;
  ethoxylated and/or propoxylated $C_8$–$C_{18}$ fatty acids containing 5 to 25 ethoxylated and/or propoxylated units;
  $C_8$–$C_{20}$ fatty acid amides containing 5 to 30 ethoxylated units;
  ethoxylated amines containing 5 to 30 ethoxylated units;
  alkoxylated amidoamines containing 1 to 50, preferably 1 to 25, more particularly 2 to 20 oxyalkylene (preferably oxyethylene) units;
  oxides of amines such as oxides of $C_{10}$–$C_{18}$ alkyl dimethylamines, oxides of $C_8$–$C_{22}$ alkoxy ethyl dihydroxy ethylamines;
  alkoxylated terpenic hydrocarbons such as ethoxylated and/or propoxylated a- or b-pinenes containing 1 to 30 oxyethylene and/or oxypropylene units;
  alkylpolyglycosides which can be obtained by condensation (for example by acid catalysis) of glucose with primary fatty alcohols (U.S. Pat. No. 3 598 865; U.S. Pat. No. 4 565 647; EP-A-0 132 043; EP-A-0 132 046, etc.) with a $C_4$–$C_{20}$ alkyl group, preferably $C_8$–$C_{18}$, also with an average number of glucose units of the order of 0.5 to 3, preferably of the order of 1.1 to 1.8 per mole of alkylpolyglycoside (APG); in particular, those with the following can be mentioned
    a $C_8$–$C_{14}$ alkyl group and an average 1.4 glucose units per mole;
    a $C_{12}$–$C_{14}$ alkyl group and an average 1.4 glucose units per mole;
    a $C_8$–$C_{14}$ alkyl group and an average 1.5 glucose units per mole;
    a $C_8$–$C_{10}$ alkyl group and an average 1.6 glucose units per mole;
  sold respectively under the trade names GLUCOPON 600 EC®, GLUCOPON 600 CSUP®, GLUCOPON 650 EC® and GLUCOPON 225 CSUP® from HENKEL;
  and/or with amphoteric and zwitterionic surfactants such as alkylbetaines, alkyldimethylbetaines, alkylamidopropylbetaines, alkylamidopropyldimethylbetaines, alkyltrimethylsulfobetaines, imidazoline derivatives such as alkylamphoacetates, alkylamphodiacetates, alkylamphopropionates, alkylamphodipropionates, alkylsultaines or alkylamidopropylhydroxysultaines, condensation products of fatty acids and protein hydrolysates, amphoteric derivatives of alkylpolyamines such as Amphionic XL® sold by Rhodia, Ampholac 7T/X® and Ampholac 7C/X® sold by Berol Nobel, proteins or protein hydrolysates;

and/or with cationic surfactants such as dialkyldimethylammonium chlorides, alkylbenzyldimethylammonium chlorides, methyl and alkylimidazolinium sulfates, methyl and methylbis(alkylamidoethyl)-2-hydroxyethylammonium; said agents being used in an amount of about 5 to about 70%, preferably 5 to 50% by weight of said composition;

inorganic or organic detergent adjuvant ("builders"), in an amount such that the total amount of detergent adjuvant is from about 5 to 80% of the weight of said composition, these detergent adjuvants being such as

- polyphosphates (tripolyphosphates, pyrophosphates, orthophosphates, hexametaphosphates) of alkali metals, of ammonium or of alkanolamines
- tetraborates or borate precursors
- alkali-metal or alkaline-earth metal carbonates (bicarbonates, sesquicarbonates)
- alkali metal silicates
- cogranulates of alkali metal silicate hydrates and of alkali metal (sodium or potassium) carbonates, described in EP-A-488,868, for detergent compositions in powder form
- crystalline or amorphous aluminosilicates of alkali metals (sodium, potassium) or of ammonium, such as zeolites A, P, X, etc.
- water-soluble polyphosphonates (ethane 1-hydroxy-1,1-diphosphonates, methylene diphosphonate salts, etc.)
- water-soluble salts of carboxylic polymers or copolymers such as water-soluble salts of polycarboxylic acids with a molecular mass of about 2000 to 100,000, obtained by polymerization or copolymerization of ethylenically unsaturated carboxylic acids such as acrylic acid, maleic acid or anhydride, fumaric acid, itaconic acid, mesaconic acid, citraconic acid or methylenemalonic acid, and most particularly polyacrylates with a molecular mass of about 2000 to 10,000 (U.S. Pat. No. 3,308,067), copolymers of acrylic acid and of maleic anhydride with a molecular mass of about 5000 to 75,000 (EP-A-66915)
- polycarboxylate ethers (oxydisuccinic acid and its salts, monosuccinic acid tartrate and its salts, disuccinic acid tartrate and its salts)
- hydroxypolycarboxylate ethers
- citric acid and its salts, mellitic acid, succinic acid and their salts
- polyacetic acid salts (ethylenediamine tetraacetates, nitrilotriacetates, N-(2-hydroxyethyl) nitrilodiacetates)
- ($C_5$–$C_{20}$)-alkyl succinic acids and their salts (2-dodecenyl succinates, lauryl succinates, etc.)
- polyacetal carboxylic esters
- polyaspartic acid, polyglutamic acid and their salts
- polyimides derived from the polycondensation of aspartic acid and/or glutamic acid
- polycarboxymethylated derivatives of glutamic acid [such as N,N-bis(carboxymethyl)glutamic acid and its salts, in particular the sodium salts] or of other amino acids
- aminophosphonates such as nitrilotris(methylene phosphonates)

soil release agents, in amounts of about 0.01–10%, preferably of about 0.1–5% and most particularly of about 0.2–3%, by weight, these agents being such as

- cellulose derivatives such as cellulose hydroxy ethers, methylcellulose, ethylcellulose, hydroxypropyl methylcellulose, hydroxybutyl methylcellulose,
- polyvinyl esters grafted onto polyalkylene trunks, such as polyvinyl acetates grafted onto polyoxyethylene trunks (EP-A-219,048)
- polyvinyl alcohols
- polyester copolymers based on ethylene terephthalate and/or propylene terephthalate and polyoxyethylene terephthalate units, optionally comprising sulfoisophthaloyl units in their chain;
- polyester copolymers based on ethylene terephthalate and/or propylene terephthalate and polyoxyethylene and/or polyoxypropylene units;
- terephthalic copolyester oligomers with sulfonated or sulfoaryl polyalkyleneoxyalkyl end groups;
- terephthalic copolyester oligomers containing sulfoisophthaloyl units in their chain.

anti-redeposition agents, in amounts of about 0.01–10% by weight for a detergent composition in powder form, of about 0.01–5% by weight for a liquid detergent composition, these agents being such as

- carboxymethylcellulose
- sulfonated polyester oligomers obtained by condensation of isophthalic acid, dimethyl sulfosuccinate and diethylene glycol (FR-A-2,236,926);
- water-soluble salts of carboxylic polymers or copolymers including salts of polyacrylic acid and copolymers of acrylic acid and maleic anhydride;

bleaching agents, in an amount of about 0.1–20%, preferably 1–10%, of the weight of said detergent composition in powder form, these agents being such as

- perborates such as sodium perborate monohydrate or tetrahydrate
- peroxygenated compounds such as sodium carbonate peroxyhydrate, pyrophosphate peroxyhydrate, urea peroxyhydrate, sodium peroxide, sodium persulfate
- percarboxylic acids and their salts (known as "percarbonates")

preferably combined with a bleaching activator generating, in situ, in the washing medium, a peroxycarboxylic acid; among these activators, mention may be made of tetraacetylethylenediamine, tetraacetylmethylenediamine, tetraacetyl glycoluryl, sodium p-acetoxybenzene sulfonate, pentaacetyl glucose, octaacetyl lactose, etc. foam suppressants, in amounts which can be up to 5% by weight, these agents being such as

- $C_{10}$–$C_{24}$ monocarboxylic fatty acids or their alkali-metal, ammonium or alkanolamine salts, fatty acid triglycerides
- saturated or unsaturated aliphatic, alicyclic, aromatic or heterocyclic hydrocarbons, such as paraffins, waxes,
- N-alkylaminotriazines
- monostearyl phosphates, monostearyl alcohol phosphates
- polyorganosiloxane oils or resins optionally combined with silica particles softeners, in amounts of about 0.5–10% by weight, these agents being such as clays enzymes in an amount which can be up to 5 mg by weight, preferably about 0.05–3 mg, of active enzyme/g of detergent composition, these enzymes being such as proteases, amylases, lipases, peroxidases, cellulase colour transfer agents, fluorescent agents, and other additives such as

- alcohols (methanol, ethanol, propanol, isopropanol, propanediol, ethylene glycol, glycerol)

buffers or fillers such as sodium sulfate, alkaline-earth metal carbonates or bicarbonates pigments.

Rinsing and/or softening compositions can comprise, in addition to copolymer (C), at least one cationic surfactant in an amount of 5 to 70%, optionally at least one nonionic surfactant in an amount of at most 10%, optical azurers, dyes, perfumes, sequestering agents ("builders").

Another application is the cleaning or the treating of rugs and moquettes.

The copolymer (C)in aqueous dispersion or solution can most particularly be used in formulations for carpets or moquettes, as a detergent agent, and/or as an agent for endowing stain resistance and/or as an agent for facilitating stain removal. It can be deposited on said surface to be treated by vaporization, by application using a shampooer, by an apparatus for injection-extraction of a solution comprising said copolymer, or simply by pouring the copolymer solution onto the surface to be treated, optionally accompanied by rubbing using a sponge or a brush.

Said formulations comprise 0.1 to 10, preferably 0.1 to 2% by weight of copolymer (C).

Said formulations may be diluted before their use.

The amount of copolymer (C) expressed in dry material is from about 0.01 to 5, preferably from 0.05 to 3 g/m$^2$ of surface. Said composition may comprise other additives such as anionic and/or non-ionic and/or amphoteric or zwitterionic agents, detergency adjutants ("builders") in an amount of 0.5 to 10%, acrylic polymers in an amount of 0.1 to 10%, soil-release agents, anti-redeposition agents, perfumes. These additives may be identical to those above mentioned. They also may comprise alcoholic solvents and bleaching agents such as oxygenated water.

Another object of the invention pertains to solid or liquid detergent compositions comprising copolymer (C).

In this specification and the appended claims, the terms "major" and "minor" amount mean greater than 50% by weight and less than 50% by weight, respectively, and all amounts, parts, percentages and ratios are by weight, unless otherwise apparent in context.

The following examples are given by way of illustration.

EXAMPLE 1

Synthesis of a PAS/PAO Copolymer Containing 1% by Weight of AlSNa

1. Production of a Jeffamine ED 2003 salt/adipic acid solution 475 g of water, 446.07 g (i.e., 0.1978 mol) of Jeffamine ED 2003 (polyoxyethylene/polyoxypropylene diamine from HUNTSMAN) and 28.93 g of adipic acid (i.e., 0.1918 mol) were weighed into a 1 litre Erlenmeyer flask. The mixture was stirred at ambient temperature for 24 hours. After complete dissolution, two samples were taken from the solution, each of 2 g. 48 g of water were added then the mixture was assayed by potentiometry with a 10% w/w acetic acid solution.

Adipic acid was added in a quantity necessary to reach the neutralization point of the solution (in this case, 1.332 g, i.e., 9.12 mmol); the solution was again stirred for 24 hours. With dissolution completed, two samples were again taken. A stoichiometric solution was obtained, with the following composition by weight: Jeffamine ED 2003: 46.88% by weight; Adipic acid: 3.18% by weight; Water: 49.94% by weight.

2. Production of a Jeffamine ED 2003 sal t/AlSNa solution 110 g of water, 98.26 g (i.e., 0.0435 mole) of Jeffamine ED 2003 and 11.74 g of Na 5-sulfoisophthalic acid (AlSNa) were weighed into a 1 litre Erlenmeyer flask. The mixture was stirred at ambient temperature for 24 hours. After complete dissolution, two samples were taken from the solution, each of 2 g. 48 g of water were added then the mixture was assayed by potentiometry with a 10% w/w AlSNa solution. The quantity of AlSNa necessary to neutralize the solution was measured for each sample taken. After adding the quantity of AlSNa necessary to reach the neutralization point of the solution (in this case, 0.116 g, i.e., 0.435 mmol), the solution was again stirred for 24 hours. The same potentiometric assay was carried out in order to know whether the neutralization point had been reached. A stoichiometric solution was obtained with the following composition by weight:

Jeffamine ED 2003: 44.64% by weight;
AlSNa: 5.39% by weight;
Water: 49.97% by weight.

3—Synthesis of PAS/POA copolymer containing 1% by weight of AlSNa—copolymer 1.3

90 g of the previously prepared Jeffamine ED 2003 salt/adipic acid solution, 15 g of the previously prepared Jeffamine ED 2003 salt/AlSNa solution, 22.52 g of caprolactam (i.e., 0.199 mol) and 0.075 g of catalyst (hypophosphorous acid, 50% by weight) were introduced into a 500 ml glass reactor provided with a metal anchor agitator.

The reactor was then closed and 3 vacuum/argon purges were carried out to eliminate oxygen. The reactor was immersed in a bath heated to 130° C. and the temperature was increased following a set program. The temperature thus reached 260° C. in 3 hours during which the water distilled. A constant stage at atmospheric pressure for one hour then a further stage at reduced pressure for 2 hours were applied.

After these stages, the reaction mass was taken back to atmospheric pressure and cooled. It was then removed from the reactor.

The end groups (NH$_2$ and COOH) and molecular mass of the copolymer were determined.

4—Post-condensation of PAS/POA copolymer containing 1.1w by weight of AlSNa with succinic anhydride—copolymer 1.4

The NH$_2$ group content having been analyzed, the quantity of anhydride to be added was calculated assuming that one NH$_2$ function reacts with one anhydride ring.

30 g of copolymer and 0.135 g of succinic anhydride (i.e., 0.001 mol) were introduced into a glass reactor and the reactor was purged three times to eliminate oxygen. The reaction mass was then heated under vacuum at 200° C. for 2 hours.

The reaction mass was taken back to atmospheric pressure and cooled. It was then removed from the reactor.

The end groups (NH$_2$ and COOH) of the copolymer were then determined.

| Copolymer | —COOH groups | —NH$_2$ groups | Molecular mass Mn (in polystyrene equivalents) | Molecular mass Mw (in polystyrene equivalents) |
|---|---|---|---|---|
| 1.3 | 51 | 47 | 22,800 | 46,120 |
| 1.4 | 62 | 26 | — | — |

EXAMPLE 2

Synthesis of a PAS/PAO Copolymer Containing 4% by Weight of AlSNa

1. Production of a Jeffamine ED 2003 salt/adipic acid solution 475 g of water, 446.07 g (i.e., 0.1978 mol) of Jeffamine ED 2003 and 28.93 g of adipic acid (i.e. 0.1918 mol) were weighed into a 1 litre Erlenmeyer flask. The mixture was stirred at ambient temperature for 24 hours. After complete dissolution, two samples were taken from the solution, each of 2 g. 48 g of water were added then the mixture was assayed by potentiometry with a 10% w/w acetic acid solution.

Adipic acid was added in a quantity necessary to reach the neutralization point of the solution (in this case, 1.332 g, i.e. 9.12 mmol); the solution was again stirred for 24 hours. With dissolution completed, two samples were again taken. A stoichiometric solution was obtained, with the following composition by weight:
Jeffamine ED 2003: 46.88% by weight;
Adipic acid: 3.18% by weight;
Water: 49.94% by weight.

2. Production of a Jeffamine ED 2003 salt/AlSNa solution 110 g of water, 98.26 g (i.e. 0.0435 mol) of Jeffamine ED 2003 and 11.74 g of Na 5-sulfoisophthalic acid (AlSNa) were weighed into a 1 litre Erlenmeyer flask. The mixture was stirred at ambient temperature for 24 hours. After complete dissolution, two samples were taken from the solution, each of 2 g. 48 g of water were added then the mixture was assayed by potentiometry with a 10% w/w AlSNa solution. The quantity of AlSNa necessary to neutralize the solution was measured for each sample taken. After adding the quantity of AlSNa necessary to reach the neutralization point of the solution (in this case, 0.116 g, i.e. 0.435 mmol), the solution was again stirred for 24 hours. The same potentiometric assay was carried out in order to know whether the neutralization point had been reached. A stoichiometric solution was obtained, with the following composition by weight:
Jeffamine ED 2003: 44.64% by weight;
AlSNa: 5.39% by weight;
Water: 49.97% by weight.

3—Synthesis of PAS/POA copolymer containing 4% by weight of AlSNa—copolymer 2.3

54 g of the previously prepared Jeffamine ED 2003 salt/adipic acid solution, 57 g of the previously prepared Jeffamine ED 2003 salt/AlSNa solution, 21.75 g of caprolactam (i.e., 0.192 mol) and 0.077 g of catalyst (hypophosphorous acid solution, 50% by weight) were introduced into a 500 ml glass reactor provided with a metal anchor agitator.

The reactor was then closed and 3 vacuum/argon purges were carried out to eliminate oxygen. The reactor was then immersed in a bath heated to 130° C. and the temperature was increased following a set program. The temperature thus reached 260° C. in 3 hours during which the water distilled. A constant stage at atmospheric pressure for one hour then a further stage at reduced pressure for 2 hours were applied.

After these stages, the reaction mass was taken back to atmospheric pressure and cooled. It was then removed from the reactor.

The end groups ($NH_2$ and COOH) and molecular mass of the copolymer were determined.

4—Post-condensation of PAS/POA copolymer containing 4% by weight of AlSNa with succinic anhydride—copolymer 2.4

The $NH_2$ group content having been analyzed, the quantity of anhydride to be added was calculated assuming that one $NH_2$ function reacts with one anhydride ring.

30 g of copolymer and 0.3835 g of succinic anhydride (i.e. 0.0014 mol) were introduced into a glass reactor and the reactor was purged three times to eliminate oxygen. The reaction mass was then heated under vacuum at 200° C. for 2 hours.

The reaction mass was taken back to atmospheric pressure and cooled. It was then removed from the reactor.

The end groups ($NH_2$ and COOH) of the copolymer were then determined.

| Copolymer | —COOH groups | —$NH_2$ groups | Molecular mass Mn (in polystyrene equivalents) | Molecular mass Mw (in polystyrene equivalents) |
|---|---|---|---|---|
| 2.3 | 120 | 128 | 20,180 | 38,190 |
| 2.4 | 140 | 73 | — | — |

EXAMPLE 3

Synthesis of a PAS/PAO Copolymer Containing 2% by Weight of AlSNa

1. Production of a Jeffamine ED 2003 salt/adipic acid solution 425 g of water, 399.63 g (i.e. 0.1772 mol) of Jeffamine ED 2003 and 25.365 g of adipic acid (i.e. 0.1737 mol) were weighed into a 1 litre Erlenmeyer flask. The mixture was stirred at ambient temperature for 24 hours. After complete dissolution, two samples were taken from the solution, each of 2 g. 48 g of water were added then the mixture was assayed by potentiometry with a 10% w/w acetic acid solution.

Adipic acid was added in a quantity necessary to reach the neutralization point of the solution (in this case, 0.536 g, i.e. 3.67 mmol); the solution was again stirred for 24 hours. With dissolution completed, two samples were again removed. A stoichiometric solution was obtained with the following composition by weight:
Jeffamine ED 2003: 46.986% by weight;
Adipic acid: 3.046% by weight;
Water: 49.968% by weight.

2. Production of a Jeffamine ED 2003 salt/AlSNa solution 200 g of water, 89.33 g (i.e. 0.0396 mol) of Jeffamine ED 2003 and 10.67 g (i.e. 0.0398 mol) of Na 5-sulfoisophthalic acid (AlSNa) were weighed into a 1 litre Erlenmeyer flask. The mixture was stirred at ambient temperature for 24 hours. After complete dissolution, two samples were taken from the solution, each of 2 g. 48 g of water were added then the mixture was assayed by potentiometry with a 10% w/w AlSNa solution. The quantity of AlSNa necessary to neutralize the solution was measured for each sample taken. The solution was perfectly neutralized; no addition of AlSNa was necessary.

A stoichiometric solution was obtained, with the following composition by weight:
Jeffamine ED 2003: 44.6665% by weight;
AlSNa: 5.335% by weight;
Water: 50% by weight.

3—Synthesis of PAS/POA copolymer containing 2% by weight of AlSNa—copolymer 3.3

233 g of the previously prepared Jeffamine ED 2003 salt/adipic acid solution, 87.4 g of the previously prepared Jeffamine ED 2003 salt/AlSNa solution, 63.65 g of caprolactam (i.e. 0.563 mol) and 0.2374 g of catalyst (hypophosphorous acid solution, 50% by weight) were introduced into a 500 ml glass reactor provided with a metal anchor agitator.

The reactor was then closed and 3 vacuum/argon purges were carried out to eliminate oxygen. The reactor was then immersed in a bath heated to 130° C. and the temperature was increased following a set program. The temperature thus reached 260° C. in 3 hours during which the water distilled.

A constant stage at atmospheric pressure for one hour then a further stage at reduced pressure for 2 hours were applied.

After these stages, the reaction mass was taken back to atmospheric pressure and cooled. It was then removed from the reactor.

The end groups ($NH_2$ and COOH) and the molecular mass of the copolymer were determined.

4—Post-condensation of PAS/POA copolymer containing 2% by weight of AlSNa with succinic anhydride—copolymer 3.4

The $NH_2$ group content having been measured, the quantity of anhydride to be added was calculated assuming that one $NH_2$ function reacts with one anhydride ring.

196.4 g of copolymer and 3.34 g of succinic anhydride (i.e. 0.033 mol) were introduced into a glass reactor and the reactor was purged three times to eliminate oxygen. The reaction mass was then heated under vacuum to 200° C. for 1 hour then at 250° C. for 2 hours.

The reaction mass was taken back to atmospheric pressure and cooled. It was then removed from the reactor.

The end groups ($NH_2$ and COOH) of the copolymer were determined.

| Copolymer | —COOH groups | —$NH_2$ groups | Molecular mass Mn (in polystyrene equivalents) | Molecular mass Mw (in polystyrene equivalents) |
|---|---|---|---|---|
| 3.3 | 81 | 84 | 20,800 | 41,500 |
| 3.4 | 108 | 45 | — | — |

The copolymers of Examples 1 to 3 were tested as regards their hydrophilization, stain resistance and stain removal properties.

HYDROPHILIZATION

Preparation of Test Sample

A film of polyamide PA 6.6 with a surface area of 70 $cm^2$ was introduced into a bath of ethanol and cleaned with ultrasound for 30 minutes at ambient temperature, then rinsed with demineralized water and heated for 2 hours in boiling demineralized water to eliminate any possible traces of oligomers from the film.

The conditioned film thus obtained was immersed at ambient temperature in a volume of 200 ml of an aqueous solution containing 2.5 g/l of copolymer to be tested, for 2 hours with stirring, then rinsed twice for 10 minutes with demineralized water with stirring, and allowed to dry in air at a relative humidity of 80% for 7 days.

This protocol produced a reproducible film surface and reproducible adsorption. Only any copolymer chains in direct interaction with the PA film were left on the surface.

A reference surface was produced using the same protocol but immersing the PA film in a solution of demineralized water containing no polymer.

The term "reference surface" as used below means the PA film free of its oligomers, then immersed in demineralized water and allowed to dry.

Wetting Measurement Method

The test PA film was treated using copolymer 3.4 of Example 3.

The surface properties of the treated film were determined by measuring wetting under double liquid geometry. The treated film was immersed in a glass tank (2 cm×5 cm×3 cm) filled with synthesis oil (Carrefour 20 W 50 oil, with viscosity $\eta$=320 mPa.s and surface tension $\gamma$=32.2 mN/m). A drop of demineralized water (volume 1 $\mu$l) was deposited on the support surface. The angle at equilibrium which characterizes wetting is governed by the surface energy of the substrate and the surface tensions of the liquids present; it is measured after 20 minutes have passed. The higher the hydrophilization by the copolymer, the smaller the [lacuna].

| Copolymer from Example | in ° |
|---|---|
| 3.4 | 88 |
| Reference surface | 135 |

STAIN RESISTANCE

Preparation of Test Sample

A film of polyamide PA 6.6 with a surface area of 50 $cm^2$ was introduced into a bath of ethanol and cleaned with ultrasound for 30 minutes at ambient temperature, then rinsed with demineralized water and heated for 2 hours in boiling demineralized water to eliminate any possible traces of oligomers from the film.

The conditioned film thus obtained was immersed at ambient temperature in a volume of 250 ml of an aqueous solution containing 2.5 g/l of copolymer to be tested, for 2 hours with stirring, then rinsed twice for 10 minutes with demineralized water with stirring, and allowed to dry in air at a relative humidity of 80% for 7 days.

This protocol produced a reproducible film surface and reproducible adsorption. Only any copolymer chains in direct interaction with the PA film were left on the surface.

A reference surface was produced using the same protocol but immersing the PA film in a solution of demineralized water containing no polymer.

The term "reference surface" as used below means the PA film free of its oligomers, then immersed in demineralized water and allowed to dry.

Coffee Coloration Test (stain resistance)

The test PA film (50 $cm^2$) was treated as described above in a volume of 250 ml of a 2.5 g/l solution of copolymers 1.3, 1.4, 2.3, 2.4, 3.3 and 3.4 of Examples 1 to 3.

The treated PA film was immersed in coffee (50 ml of an aqueous 2% solution of Nescafé Expresso from Nestlé) for 30 minutes at ambient temperature, then dried. Its coloration DE was then measured using a chromameter (Minolta CR-300 from Minolta) along the 3 axes L, a, b, with respect to a "white" PA film (reference surface which had not been immersed in coffee):

$$DE_{sample}=\sqrt{DL^2+Da^2+Db^2}$$

where $DL=L_{sample}-L_{white}$ $Da=a_{sample}-a_{white}$ $Db=b_{sample}-b_{white}$ The coloration of the sample was then normalised with respect to a reference film (reference surface) which had undergone the same immersion in the coffee; the normalised coloration was equal to the ratio $$R=DE_{sample}/DE_{reference}$$

A ratio R of less than 1 indicates that the treated sample is less colored than the reference.

The following results were obtained:

| Copolymer from Example: | Amount of —COOH in meq/kg | Amount of —NH$_2$ in meq/kg | % AlSNa (% so$_3^-$) | R |
|---|---|---|---|---|
| 1.3 | 51 | 47 | 1 (0.298) | 1.21 |
| 1.4 | 62 | 26 | 1 (0.298) | 1.03 |
| 2.3 | 120 | 128 | 4 (1.192) | 1.01 |
| 2.4 | 140 | 73 | 4 (1.192) | 0.87 |
| 3.3 | 81 | 84 | 2 (0.596) | 1.06 |
| 3.4 | 108 | 45 | 2 (0.596) | 0.91 |

SOIL RELEASE

Pre-treatment of Moguettes

Aqueous solutions of copolymer for treatment were applied to pieces of Sommer beige tufted moquette (reference New Neptune, shade J480, 100% polyamide pile, 1840 g/m$^2$) by spraying, so as to obtain a deposit (expressed as solids) of 0.05, 0.1 or 0.5 parts by weight per 100 parts by weight of pile. 100 ml of copolymer solution were sprayed on per 100 g of pile; the "useful" surface mass of the moquette (pile) was estimated to be 600 g/m$^2$. An untreated piece of moquette acted as a reference.

Staining/stain Removal Test

The method consisted of producing a variety of stains on pieces of moquette treated using a solution of copolymer 3.4 and removing the stain with the cleaning product following the manufacturer's instructions.

The pieces of moquette were stained with the following 4 staining products:

| Coffee | Carte Noire brand from Maxpax | 10 drops |
|---|---|---|
| Wax | Kiwi shoe polish from Kiwi | Rubbing, depositing a small amount |
| Ball-point pen | Black, Bic brand | 5 lines |
| Lipstick | Deep gamet red 03 from Gemey | 1 line |

The stained pieces of moquette were left for 24 hours then the stains were removed using the following protocol:

Cleaning product used to remove stains:

K2r (from K2r Produkte AG), special cleaner in an aerosol can

Stain removal method:
1) Absorption of excess liquid using an absorbent non-woven fabric or elimination by scraping or scratching with a spatula for viscous products or crumbly solids.
2) Use of stain removal product following the manufacturer's instructions:
    Spraying on foam;
    Penetrating the foam using a brush and an absorbent non-woven fabric then combing the pile;
    until the stain had been completely eliminated or the impression was obtained that no more could be removed (no trace on the non-woven fabric).
3) Drying as much as possible using the absorbent non-woven material;
4) Combing the pile;
5) Vacuuming;
6) Grading.

Stain removal was graded by 5 persons using the following scale:

0: no removal
1: slight removal
2: substantial removal;
3: almost complete removal;
4: complete removal.

Half-points could be awarded. The result shown is the average of these 5 gradings. A difference of 0.5 was considered to be significant.

The following results were obtained:

| % by weight of copolymer deposited (copolymer/pile) | Coffee | Shoe polish | Ball-point pen | Lipstick |
|---|---|---|---|---|
| 0 (untreated reference) | 1.7 | 2.3 | 2.8 | 1.7 |
| 0.05% of copolymer 3.4 | 2.3 | 3.4 | 3.9 | 3.0 |

It can be seen that pre-treatment with a low concentration of copolymer affords better soil release of fatty stains and of coffee.

Soiling—Cleaning Test

The following operations were carried out in succession: treatment of pieces of moquette as indicated above, soiling, vacuuming, cleaning, with photometric measurements and calculation of the soil release.

Sample preparation

Three samples were cut out from pieces of moquette (180 mm×200 mm) pre-treated using a solution of copolymer 3.4 of Example 3.

"Barrel" soiling of samples

Cubes of foam were soiled in a rotary stone mill with a normalised suspension of dust in perchloroethylene. The samples were soiled by fixing them to the inner wall of a cylindrical barrel which was rotated and into which the soiled and dried foam cubes, porcelain beads and a tetrapod had been placed. These soiled samples were photometrized.

Vacuuming

The soiled samples were vacuumed using a vacuum cleaner provided for this purpose.

Injection-extraction

Injection-extraction was carried out on the pre-treated samples by fixing them in three cavities in a plate provided for the purpose, and using an injection-extraction machine with a solution of the cleaning product. Product used: Wetrok Retex (weak detergent from Wetrock).

The samples were then dried in the open air and vacuumed and photometrized.

Calculations

The photometric measurements of the reflectance values were carried out using a Datacolor Elrepho 2000 spectrophotometer at a wavelength of 680 mm, with no UV, spot adjusted to 27.

Four measurements were carried out on each sample and the average figure produced.

The following values were obtained:
new (not pre-treated) samples: $Y_0$
Pre-treated and soiled samples: $Y_1$
Pre-treated, soiled and cleaned samples: $Y_3$
The percentage soil release was thus equal to $$R' = \frac{Y_3 - Y_1}{Y_0 - Y_1} \times 100$$

The following results were obtained:

| % by weight of copolymer deposited (copolymer 3.4/pile) | R % |
|---|---|
| 0 (untreated reference) | 39% |
| 0.1% | 62% |
| 0.5% | 63% |

It can be seen that pre-treatment of polyamide moquettes improves soil release on cleaning with a detergent, and that a small quantity (0.1%) of copolymer is sufficient.

DETERGENCE

Equipment:
Pale color nylon fiber moquette (off-white)
Stain sources: spent engine oil, lipstick (bright red from Revlon), "Old World" spaghetti sauce, "Kiwi" black shoe polish, tea and coffee.
Analytical balance
Micropipette
Application sponge
White paper towel
Timer
"Dirt Devil" vacuum cleaner
"Bissel" steam cleaner
"Rug Doctor" professional steam cleaning concentrate Procedure Moquette preparation
1) The moquette was cleaned from one side to the other, front and back, with the "Rug Doctor" concentrate diluted in accordance with the brand instructions (2 oz per gallon) using a "Bissel" steam cleaner.
2) After drying, the moquette was cut into 4"×4" squares and marked at the bottom to ensure that the pile ran in the same direction to obtain similar appearance characteristics (less reflection).
3) The moquette samples were labelled to indicate the tests and products.

Staining/cleaning

1) Two tests were carried out on each stain. Rdl was measured before staining the samples.
2) Oil stains were produced using the micropipette; polish stains were first weighed onto the application sponge and then applied to the moquette samples. The oil stains were applied in an amount of 0.12±0.05 g to each moquette sample inside a 2"×2" square mask using a spatula. The polishes were applied in an amount of 0.15±0.05 g by weight.
3) The stains were allowed to dry overnight before cleaning. Rd2 was measured.

4) Following the recommendations on the moquette label, the moquette samples were dried with filter paper, four times, each time for five seconds, using white absorbent paper towels.
5) The moquette samples were then treated with 4.0±0.1 g of a suitable carpet cleaning product from a distance of 4–6".
6) The product was left for the time recommended on the label to enable the foam to penetrate into the stain.
7) Using an absorbent material and a dry paper towel, the stains were cleaned by rubbing five times from the top of the stain through the centre. The paper towel was turned over to obtain a clean surface and then the stain was rubbed a further five times from the bottom of the stain through the centre.
8) Steps 5 to 7 were repeated four more times to give a total of five cycles of cleaning treatment.
9) The moquettes were dried and vacuumed. Rd3 was measured.
10) Percentage soil release=

$$R'' = \frac{Rd2 - Rd3}{Rd2 - Rd1} \times 100$$

The following results were obtained:

| Formulation | Lipstick | Spent oil | Coffee | Tea | Spaghetti sauce |
|---|---|---|---|---|---|
| Standard | 17.35 | 34.24 | 87.8 | 85.14 | 51.47 |
| Standard + 0.5% of copolymer 3.4 | 49 | 69.9 | 100 | 90 | 63.29 |
| Standard + 1% of copolymer 3.4 | 61.22 | 87.1 | 100 | 97.07 | 73.5 |

What is claimed is:
1. A method for treating a hard surface comprising the step of cleaning said surface with a formulation comprising from 0.05 to 10% by weight of a water-soluble or water-dispersible copolymer comprising:
(a) at least one polyoxyalkylene unit having from about 2 to about 200 oxyalkylene units, wherein said oxyalkylene units are the same or different and wherein the alkylene units thereof contain from about 2 to about 12 carbon atoms and are branched or linear; and
(b) at least one sulfonated polyamide unit comprising:
(i) non-sulfonated polyfunctional elementary units consisting of a lactam-derived/dicarbonyl group having the formula —C(O)—K—N(R)—C(O)—A—C(O)—
in which formulae:
A represents an liphatic, cycloaliphatic or aromatic hydrocarbon group;
K represents an liphatic, cycloaliphatic or aromatic group; and
the symbols R identical or different represent a hydrogen atom or a $C_1$–$C_4$ alkyl group;
(ii) sulfonated polyfuncitonal units which are similar or different with formula:

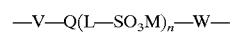

wherein:

the symbols V and W, which are identical or
different, represent:
a carbonyl —C(O)—group;
the symbol Q represents an aromatic, aliphatic or
cycloalipahtic hydrocarbon group;
L is a valence bond or an alkylene, alkoxyalkylene,
oxyalkylene, arylene, alkylarylene or
alkoxyarylene group; and
M represents a hydrogen atom or an alkaline cation;
n is 1 or more; and
(iii) binding groups of elementary units of formula:

—C(O)—O—, —O—C(O)— provided that for said copolymer:
the quantity of $SO_3M$ functions, expressed as the mass of $SO_3^-$ function, in said sulfonated polyamide unit or units is such that it represents at least about 0.1% of the total copolymer mass;
the mass ratio of the total polyoxyalkylene units/total sulfonated polyamide units is about 95/5 to about 30/70;
the number of amine functions —$NH_2$ present in said copolymer is at most about 80 milliequivalents per kilogram of copolymer; and
the number of carboxyl functions —COOH present in said copolymer is at least about 80 milliequivalents.

2. A method of claim 1 wherein said surface is a shower.

3. A method of claim 1 wherein said copolymer is used in an amount of about 0.01 to about 5 g/m² of surface.

4. A method of claim 3 wherein said copolymer is used in an amount of about 0.05 to about 3 g/m² of surface.

5. A method of claim 1, wherein said copolymer is in solution or in aqueous dispersion.

6. A method for treating a textile surface comprising the step of applying to said surface a composition comprising from 0.05 to 10% by weight of a water-soluble or water-dispersible copolymer comprising:
(a) at least one polyoxyalkylene unit having from about 2 to about 200 oxyalkylene units, wherein said oxyalkylene units are the same or different and wherein the alkylene units thereof contain form about 2 to about 12 carbon atoms and are branched or linear; and
(b) at least one sulfonated polyamide unit comprising:
(i) non-sulfonated polyfunctional elementary units consisting of a lactam-derived/dicarbonyl group having the formula —C(O)—K—N(R)—C(O)—A—C(O)—
in which formulae:
A represents an alipahtic, cycloaliphatic or aromatic hydrocarbon group;
K represents an aliphatic, cycloaliphatic or aromatic group; and
the symbols R identical or different represent a hydrogen atom or a $C_1$–$C_4$ alkyl group;
(ii) sulfonated polyfunctional units which are similar or different with formula:

—V—Q(L—$SO_3M$)$_n$—W— wherein:
the symbols V and W, which are identical or different, represent:
a carbonyl —C(O)— group;
the symbol Q represents an aromatic, aliphatic or cycloaliphatic hydrocarbon group;
L is a valence bond or an alkylene, alkoxyalkylene, oxyalkylene, arylene, alkylarylene or alkoxyarylene group; and M represents a hydrogen atom or an alkaline cation;
n is 1 or more; and
(iii) binding groups of elementary units of formula:
—C(O)—O—, —O—C(O)—
provided that for said copolymer:
the quantity of $SO_3M$ functions, expressed as the mass of $SO_3^-$ function, in said sulfonated polyamide unit or units is such that it represents at least about 0.1%, of the total copolymer mass;
the mass ratio of the total polyoxyalkylene units/total sulfonated polyamide units is about 95/5 to about 30/70;
the number of amine functions —$NH_2$ present in said copolymer is at most about 80 milliequivalents per kilogram of copolymer; and
the number of carboxyl functions —COOH present in said copolymer is at least about 80 milliequivalents.

7. A method of claim 6, wherein said copolymer is used in an amount of about 0.01 to about 5 g/m² of surface.

8. A method of claim 6, wherein said copolymer is in solution or in aqueous dispersion.

9. A method of claim 6 wherein said surface is a synthetic organic polymer.

10. A method of claim 6 wherein said surface is a polyamide textile surface.

11. A method of claims wherein said surface is a carpet.

12. A method of claim 11 wherein said surface is a polyamide carpet copolymer is used in an amount of about 0.01 to about 5 g/m² of surface.

13. A detergent composition for cleaning hard or textile surfaces comprising a surfactant and a water-soluble or water-dispersible copolymer comprising:
(a) at least one plyoxyalkylene unit having from about 2 to about 200 oxyalkylene units, wherein said oxyalkylene units are the same or different and wherein the alkylene units thereof contain from about 2 to about 12 carbon atoms and are branched or linear; and
(b) at least one sulfonated polyamide unit comprising:
(i) non-sulfonated polyfunctional elementary units consisting of a lactam-derived/dicarbonyl group having the formula —C(O)—K—N(R)—C(O)—A—C(O)—
in which formulae:
A represents an aliphatic, cycloaliphatic or aromatic hydrocarbon group;
K represents an aliphatic, cycloaliphatic or aromatic group; and
the symbols R identical or different represent a hydrogen atom or a $C_1$–$C_4$ alkyl group;
(ii) sulfonated polyfunctional units which are similar or different with formula:

—V—Q(L—$SO_3M$)$_n$—W— wherein:
the symbols V and W, which are identical or different, represent:
a carbonyl —C(O)—group;
the symbol Q represents an aromatic, aliphatic or cyloaliphatic hydrocarbon group;
L is a valence bond or an alkylene, alkoxyalkylene, oxyalkylene, arylene, alkylarylene or alkoxyarylene group; and
M represents a hydrogen atom or an alkaline cation;
n is 1 or more; and
(ii) binding groups of elementary units of formula:

—C(O)—O—, —O—C(O)— provided that for said copolymer:
- the quantity of $SO_3M$ functions, expressed as the mass of $SO_3^-$ function, in said sulfonated polyamide unit or units is such that it represents at least about 0.1%, of the total copolymer mass;
- the mass ratio of the total polyoxyalkylene units/total sulfonated polyamide units is about 95/5 to about 30/70;
- the number of amine functions —$NH_2$ present in said copolymer is at most about 80 milliequivalents per kilogram of copolymer; and
- the number of carboxyl functions —COOH present in said copolymer is at least about 80 milliequivalents.

14. A detergent composition of claim 13 wherein said composition is comprised of about 0.05% to about 10% by weight of said copolymer.

15. A detergent composition of claim 14 wherein said composition is comprised of about 0.1% to about 2% by weight of said copolymer.

16. A shower rinsing method comprising the steps of:
   a) dampening the surface of the shower with water, and
   b) spraying a composition as defined in claim 15.

17. A method of claim 16 wherein surface is made of porcelain, ceramic tiles, plexiglas or glass fibers.

18. A composition for shower rinsing comprising more than 50% by weight of an aqueous medium, from about 0.1% to about 5% of a chelating agent, from about 0.05% to about 10% of a surfactant, and from about 0.1% to about 5% of a water-soluble or water-dispersible copolymer comprising:
   (a) at least one polyoxyalkylene unit having from about 2 to about 200 oxyalkylene units, wherein said oxyalkylene units are the same or different and wherein the alkylene units thereof contain form about 2 to about 12 carbon atoms and are branched or linear; and
   (b) at least one sulfonated polyamide unit comprising:
      (i) non-sulfonated polyfunctional elementary units consisting of a lactam-derived/dicarbonyl group having the formula —C(O)—K—N(R)—C(O)—A—C(O)—
      in which formulae:

A represents an alipahtic, cycloaliphatic or aromatic hydrocarbon group;
      K represents an liphatic, cycloaliphatic or aromatic group; and
      the symbols R identical or different represent a hydrogen atom or a $C_1$–$C_4$ alkyl group;
      (ii) sulfonated polyfunctional units which are similar or different with formula:

—V—Q(L—$SO_3M$)$_n$—W— wherein:
      the symbols V and W, which are identical or different, represent:
         a carbonyl —C(O)—group;
      the symbol Q represents an aromatic, aliphatic or cycloaliphatic hydrocarbon group;
      L is a valence bond or an alkylene, alkoxyalkylene, oxyalkylene, arylene, alkylarylene or alkoxyarlylene group; and
      M represents a hydrogen atom or an alkaline cation;
      n is 1 or more; and
      (iii) binding groups of elementary units of formula:
         —C(O)—O—, —O—C(O)—
provided that for said copolymer;

the quantity of $SO_3M$ functions, expressed as the mass of $SO_3^-$ function, in said sulfonated polyamide unit or units is such that it represents at least about 0.1%, of the total copolymer mass;

the mass ratio of the total polyoxyalkylene units/total sulfonated polyamide units is about 95/5 to about 30/70;

the number of amine functions —$NH_2$ present in said copolymer is at most about 80 milliequivalents per kilogram of copolymer; and the number of carboxyl functions —COOH present in said copolymer is at least about 80 milliequivalents.

* * * * *